United States Patent
Abts

[19]

[11] Patent Number: 6,000,059
[45] Date of Patent: Dec. 14, 1999

[54] MECHANICAL COUNTER PRESSURE GLOVE FOR SPACESUIT

[75] Inventor: Kevin James Abts, Hermosa Beach, Calif.

[73] Assignee: AlliedSignal Inc., Morristown, N.J.

[21] Appl. No.: 09/143,041

[22] Filed: Aug. 28, 1998

[51] Int. Cl.⁶ .................................................. A41D 19/00
[52] U.S. Cl. ............................................... 2/161.6; 2/2.11
[58] Field of Search .................................. 2/2.11, 161.6, 2/159, 161.1, 161.7, DIG. 3, 20, 69, 81, 79, 102, 16, 2.14; 128/DIG. 20; 600/20

[56] References Cited

U.S. PATENT DOCUMENTS

| | | | |
|---|---|---|---|
| 2,762,047 | 9/1956 | Flagg et al. | 2/DIG. 3 |
| 3,411,500 | 11/1968 | Gatts | 600/20 |
| 3,564,614 | 2/1971 | Getchell et al. | 2/2.11 |
| 3,577,977 | 5/1971 | Ritzinger et al. | 600/20 |
| 4,455,685 | 6/1984 | Steffler et al. | 2/2.11 |
| 4,674,479 | 6/1987 | Jennings et al. | 2/DIG. 3 |
| 5,003,630 | 4/1991 | Bassick et al. | 2/2.11 |
| 5,257,418 | 11/1993 | Jaskiewicz | 2/161.6 |
| 5,369,807 | 12/1994 | Cho et al. | 2/161.7 |
| 5,537,686 | 7/1996 | Drutz, Jr. et al. | 2/2.14 |
| 5,537,688 | 7/1996 | Reynolds et al. | 2/161.6 |
| 5,603,118 | 2/1997 | Solomon | 2/DIG. 3 |
| 5,659,895 | 8/1997 | Ford, Jr. | 2/2.11 |
| 5,771,490 | 6/1998 | Reynolds et al. | 2/161.6 |

OTHER PUBLICATIONS

National Aeronautics and Space Administration, "Comet", (approximately Nov. 1971).

*Primary Examiner*—Amy Vanatta
*Attorney, Agent, or Firm*—Robert Desmond, Esq.

[57] ABSTRACT

A mechanical counter pressure glove includes an elastic supportive material and a plurality of pre-pressurized bladders in the supportive material. At least one of the bladders is configured to match a configuration of a palm of a hand. The bladders may also be configured to match other parts of the hand, such as the dorsum and fingers. Each of the bladders is pre-pressurized to match a tissue pressure in the user's hand prior to the glove being worn. Thereby, the bladders are self contained and omit the need for a constant available supply of gas pressure from an external source.

14 Claims, 1 Drawing Sheet

MECHANICAL COUNTER PRESSURE GLOVE FOR SPACESUIT

BACKGROUND OF THE INVENTION

The present invention generally relates to vascular support garments. More specifically, the present invention relates to counter pressure garments that can be used in low pressure environments such as outer space.

In environments having very small or no ambient gas pressure, such as high altitude or the vacuum of space, a subject's respiration and circulatory balance are of concern. Gas needs to be delivered to the subject's lungs at a high enough pressure to cause diffusion of oxygen into the blood. It has been found that a gas pressure of about 80 mm Hg is minimally needed for proper breathing. An oxygen pressure of about 160 mm Hg is normally experienced at sea level. For the current design of the NASA Extravehicular Mobility Unit (EMU) spacesuit, the oxygen pressure is about 222 mm Hg.

As ambient gas pressure rises, blood pressure similarly rises. But tissue pressure that substantially matches the blood pressure must exist. Otherwise, the circulating blood can rush into low pressure areas and pool. If tissue pressure is not sufficiently high, the veins (and particularly the small ones) will become engorged with blood. As venous engorgement continues, pressure within the veins and capillaries continues to increase. If the pressure exceeds about 10 mm Hg, measurable amounts of excess fluid can be forced through the capillary walls and accumulate in the tissues. The accumulation of fluid can result in edema and a decrease in the circulating blood volume.

To provide adequate pressure in the tissue to prevent pooling, various suits have been employed to provide a counter pressure on the tissue. In the context of space, one such suit has been a "full pressure suit." It is a gas filled pressure suit that is anthropomorphically shaped, gas-tight, and pressurized with oxygen. Typically, these suits have used a rigid but flexible pressure restraining outer garment. Another type of suit has been referred to as a "partial pressure suit." Therein, an elastic or inelastic outer garment typically covers bladders that are filled with a gas. The bladders, together with the garment, can then apply constant counter pressure to the body. In contrast, a full pressure suit does not typically contain bladders since the pressure within the suit can provide the counter pressure. Usually, the bladders in the partial pressure suits are not pre-pressurized with a gas. Rather, they are filled with air or nitrogen from a gas pressure source that is external to the bladders. And the bladders are filled after the garment has been donned. Also incorporated under the inelastic garment of some partial pressure suits are tubes or capstans running over the limbs and trunk. As with the above bladders, the tubes are not pre-pressurized with gas. Thus, they too must be inflated after donning to apply counter pressure to the body.

While addressing some of the physiological concerns, the full pressure suits have posed various problems. There is a relatively high energy cost of activity. Gas pressurized limbs and torso cause severe restrictions in mobility. Body temperature regulation due to the impermeability of the suit necessitates elaborate cooling systems. And with the need for pressurized gas within the suit, a danger with leaks resulting from ruptures or tears exits. Due to the complexity of the surface and small size of a hand, bulky gas pressurized gloves severely limit dexterity and tactility.

In part to minimize the disadvantages associated with high energy cost and restricted mobility in gas filled suits, a space activity suit (SAS) or partial pressure suit was developed with elastic material which itself provided counter pressure to the body. The partial pressure suit also allowed direct evaporation of sweat in the absence of the type of cooling system associated with a gas filled suit. Also, the partial pressure suit has tended to be less bulky than the full pressure suit, thereby increasing mobility.

Notwithstanding its advantages, the partial pressure suit still has drawbacks. For example, if a counter pressure is to be evenly applied around a circumference, a body part must be perfectly circular. But the body is not circular, and is instead ovate, ellipsoidal and irregular. Areas of the body that are far from circular include the hands, which have a concave palm and a convex dorsum. Further, body radii in muscular areas change during contraction and relaxation. And with noncircular and/or muscular areas, the suit material has a tendency to gap away from the body, even when the material is elastic. In the specific context of the hand, the elastic material tends to primarily press at the outer edge of the hand and, accordingly, leave the dorsum and palm without significant counter pressure.

One effort to address the problem of gaping has included the use of a single oil filled bag at the dorsum to fill the void in the gap. Similarly, a bladder has been filled with gas from an external source and thereby applies a counter pressure to the dorsum. But when such a bag or bladder is used in the glove of a suit, fluid accumulation has only been reduced, not substantially eliminated. That has been especially so in the palm area of the hand. Perhaps more importantly, the need for a constant external gas source to a bladder can significantly affect reliability. Also, as the need for more counter pressure increases, so does the need for a bag that is larger and/or nonpliable. However, as the bag increases in size and/or stiffness, dexterity and tactility decrease. Additionally, increased size and stiffness makes donning and doffing more difficult.

As can be seen, there is a need for an improved counter pressure garment and, specifically, a glove for low pressure environments, such as outer space. Also needed is an improved counter pressure glove that can provide a counter pressure of about 222 mm Hg, which is the breathing pressure inside the most conventional full pressure suit. A further need is for a garment that can provide counter pressure to blood supplied tissue that is significantly non-circular in shape and subject to frequent contraction, such as a human hand. Another need is for a space suit glove that not only provides adequate counter pressure to the palm of a hand but is also relatively easy to don and doff. Yet another need is for a method of equalizing a breathing pressure and tissue pressure in the palm of a hand.

SUMMARY OF THE INVENTION

A counter pressure garment for blood supplied tissue comprises a supportive material; and a gas pressurized bladder supported by the supportive material, with the bladder being capable of applying a counter pressure to the tissue in the absence of the bladder being fixed to an external gas pressure source.

These and other features, aspects and advantages of the present invention will become better understood with reference to the following drawings, description and claims.

DETAILED DESCRIPTION OF THE INVENTION

Figure 1:
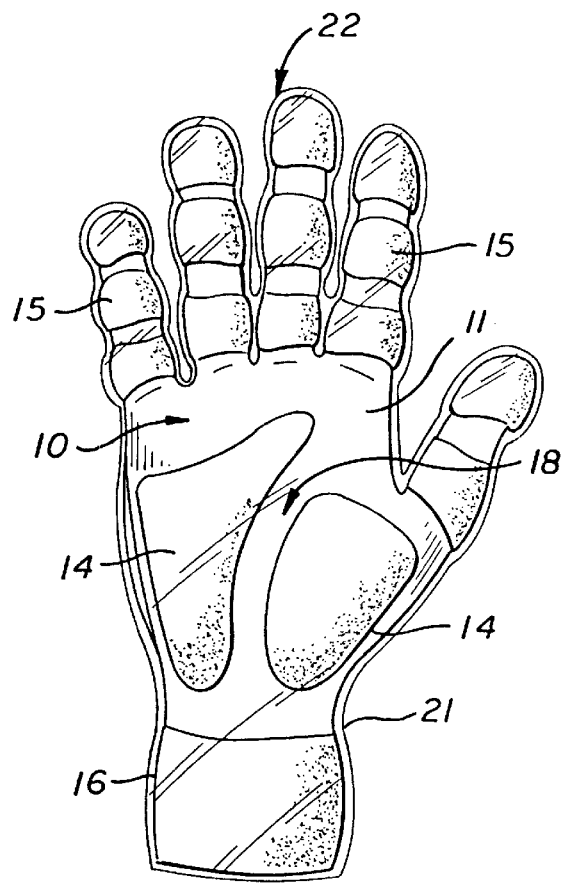
FIG. 1 depicts a palm of a hand covered by a mechanical counter pressure glove according to one embodiment of the present invention.

FIG. 1 depicts a counter pressure garment or glove 22 covering a palm 11 of a hand 10. The glove 22, in this embodiment, includes a supportive material 21 and a plurality of pre-pressurized gas bladders 13, 14, 15, 16 therein. Generally, the supportive material 21 exerts a force or counter pressure on the hand 10, as well as the bladders 13–16. The bladders 13–16 have been pre-pressurized with a gas before a user dons the glove 22. The pre-pressurization is matched to the user's breathing pressure and, therefore, tissue pressure of the user's body, including the hand 10. For example, the bladders 13–16 may be pre-pressurized to about 4.3 psi to match a typical breathing pressure in a full pressure suit for outer space. Thereby, pooling of blood in the tissue located adjacent the bladders 13–16 is eliminated or, at least, minimized.

Although the embodiment of the present invention is disclosed in the context of a garment 22 for a hand, it should be understood that the present invention may be utilized for other parts of a body, such as an ankle, groin or armpit. Thus, the garment 22 can be shaped into forms other than a glove. Further, while the present invention is described in the context of human subjects, it is contemplated that the present invention can be useful on non-human subjects. Additionally, even though the present invention is described in this embodiment as capable of achieving about 4.3 psi (222 mm Hg) in the environment of space, other counter pressures in other environments are contemplated.

In more particularly describing a specific embodiment of the present invention, the supportive material 21 is generally elastic in nature and shaped to match a particular body part, such as the hand 10. An example of a useful material for constructing the supportive material 21 is Lycra. While various supportive materials 21 may be employed, the choice of material 21 is dependent, in part, on the amount of counter pressure to be achieved on the blood supplied tissue, as further described below. In other words, greater counter pressure may require a supportive material 21 that has less elasticity (i.e., stretches less with the same amount of force). Also, the sizing of the supportive material 21 can be used to alter the amount of counter pressure exerted, via the bladders 13–16 on the tissue. Thus, for example, if the greater counter pressure is desired, the sizing of the support material 21 can be reduced to exert more force on the bladders 13–16, as further described below.

Figure 2:
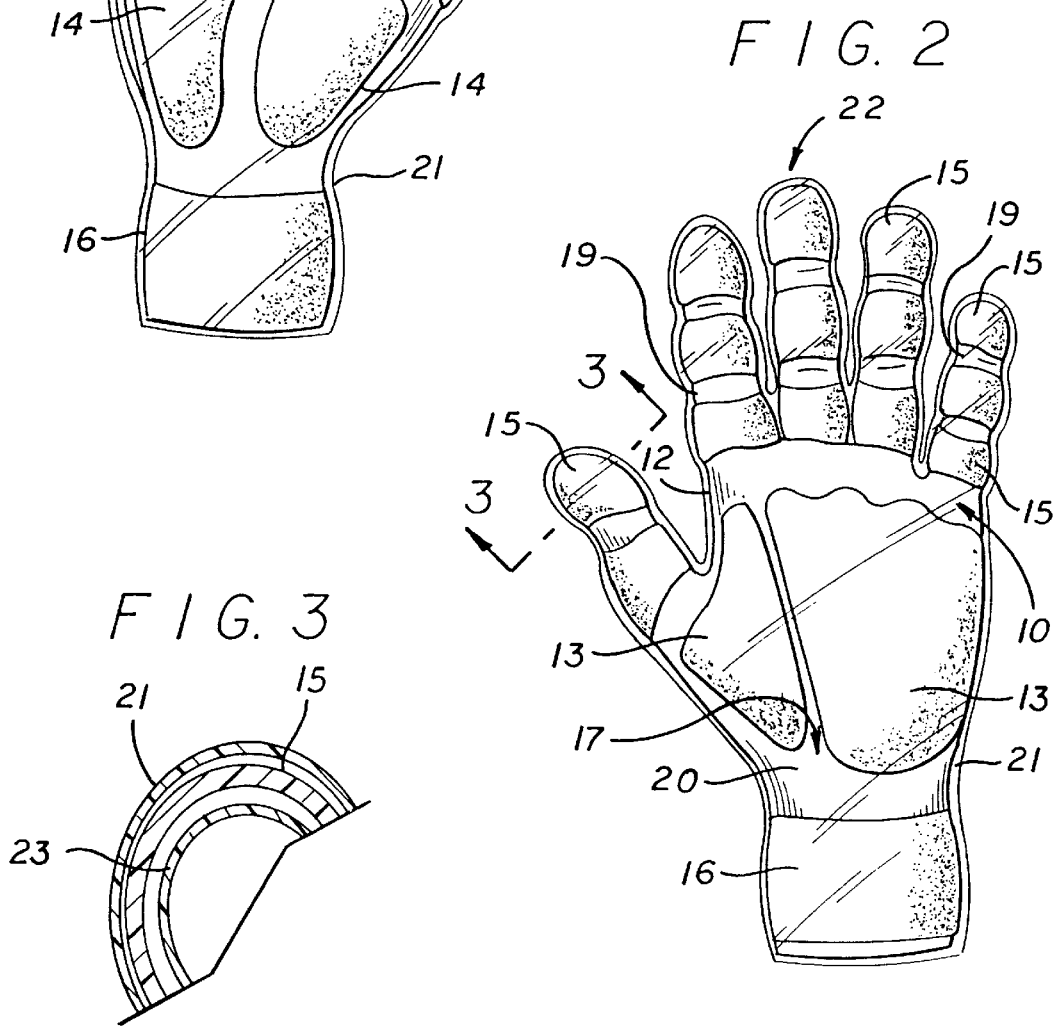
FIG. 2 depicts a dorsum of a hand covered by the mechanical counter pressure glove shown in FIG. 1.

In the embodiment shown in FIGS. 1 and 2, the glove 22 includes a plurality of dorsum bladders 13, palm bladders 14, finger bladders 15, and a wrist bladder 16. As better shown in FIG. 3, the supportive material 21 of the glove 22 overlays the bladders 13–16 (with only the finger bladder 15 being shown for purposes of example), while the bladders 13–16 overlay the tissue (with only a finger 23 being shown for purposes of example). Even though not depicted in the drawings, the bladders 13–16 can be attached to the inside of the glove 22, such as by sewing. And if greater comfort is desired, a cushioning layer (not shown) may be inserted between the bladders 13–16 and the tissue to be counter pressurized, such as the palm 11. The cushioning layer may, for example, be of a foam or gel.

Figure 3:
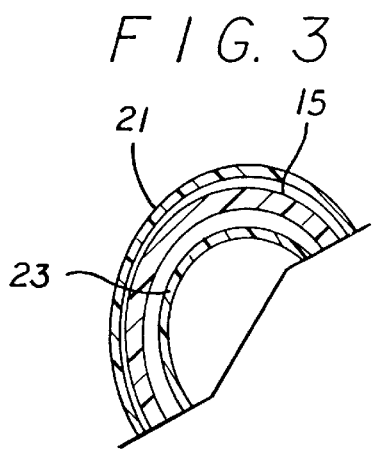
FIG. 3 is a cross sectional view of a thumb covered by the mechanical counter pressure glove shown in and taken along line 3—3 of FIG. 2.

Notwithstanding the embodiment shown in FIGS. 1–3, it should be understood that the glove 22 need not include all of the bladders 13–16. For example, with the palm 11 being perhaps the most difficult area of the hand 10 to apply a counter pressure, only the palm bladders 14 might be utilized. Further, although the number of palm bladders 14 and dorsum bladders 13 equals two in this embodiment, it should be understood that the number of any one type of bladder 13–16 can be varied. By having a greater number of any one type of bladder 13–16, the ability of the bladders in the aggregate to match the tissue configuration of the palm 11, for example, is increased.

Similarly, the shape of the individual bladders 13–16 can vary, depending upon the contour of the tissue to be counter pressurized. Yet, the finger bladders 15 are preferably of a cylindrical shape to provide at least two functions. One function is to apply a counter pressure to the fingers. A second function is to stretch the supportive material 21 in the finger areas to increase the ease of donning. In other words, since the supportive material 21 will be of a size and elasticity to itself provide an amount of counter pressure, the finger areas of the glove 22 will have a restricted amount of access for fingers to be inserted. But with the finger bladders 15, the supportive material 21 will be stretched to allow easier access for the fingers.

The bladders 13–16 are generally of a material that can hold a gas pressure therein. The amount of gas pressure is dependent upon the desired amount of counter pressure to the tissue. As an example, with a desired counter pressure of about 4.3 psi or about 222 mm Hg, the material can be a rubber formed in the shape of a bag or simply a layer of closed cell foam. The bladders 13–16 are pre-pressurized with the desired pressure before the user dons the glove 22, unlike the bladders of the prior art. In other words, during the manufacture of the bladders 13–16 the desired gas pressure is placed within the individual cells of a closed cell foam material or within the bag shaped rubber. Thereafter, the bladders 13–16 can be incorporated into the supportive material 21. It can thus be appreciated that with pre-pressurization, the bladders 13–16 need not be attached to an external gas pressure source, as in the past.

As mentioned above, the bladders 13–16 are configured and dimensioned to match the configuration and dimension of the tissue to which they are placed adjacent when the garment 22 is worn. Thus, for the dorsum 12 which has a dorsum crease area 17 where a thumb might articulate, the dorsum bladders 13 are configured to cover the dorsum 12 but leaving the dorsum crease area 17 uncovered. Doing so allows the thumb to be articulated while providing a counter pressure on the dorsum 12. Similarly, the palm 11 has a palm crease area 18 at which the thumb articulates. Thus, the palm bladders 14 are configured and dimensioned to leave the palm crease area 18 uncovered. Further, if finger bladders 15 and/or a wrist bladder 16 are being utilized, those bladders can be configured to leave uncovered finger crease areas 19 and a wrist crease area 20, respectively. In essence, the bladders 13–16 can be configured and dimensioned to leave uncovered parts of the body that require articulation or similar movement.

As can be appreciated, in the context of outer space, a user may don the glove or garment 22 in a decompression chamber. After donning, the chamber can be decompressed. During decompression, the gas within the pre-pressurized bladders 13–16 expands and causes an inflation of the bladders. The inflated bladders 13–16 then apply a mechanical counter pressure on the tissue covered by the bladders. And if a breathing pressure within a full pressure space suit is set at about 4.3 psi, the bladders 13–16 can be optimized to provide an equivalent amount of counter pressure. When the user re-enters the decompression chamber and the chamber is re-pressurized, the gas in the bladders 13–16 is compressed and the bladders contract or deflate. Upon deflation, the counter pressure on the tissue is released and the garment 22 can be readily removed.

With the garment 22 of the present invention, it can be seen that a simple design is provided and which eliminates the need for having an external gas pressure source fixed to the garment 22 and, specifically, the bladders 13–16, as in the prior art. The bladders 13–16 can thus be considered self-contained since they carry their own needed gas pressure. The bladders 13–16 enable counter pressurization without having to be concurrently filled with a gas, as in the prior art. Without such a need for a constant gas source, the present invention eliminates the need for the tube used in the prior to connect the garment bladders to the gas source or pressure within the full pressure suit. Yet, the garment 22 of the present invention can still provide a counter pressure that matches the tissue pressure or breathing pressure of the user.

It should be understood, of course, that the foregoing relates to preferred embodiments of the invention and that modifications may be made without departing from the spirit and scope of the invention as set forth in the following claims.

We claim:

1. A counter pressure garment for blood supplied tissue, comprising:

an elastic supportive material; and a permanently sealed gas pressurized bladder disposed between said supportive material and said blood supplied tissue, said bladder being pre-pressurized at a pre-determined pressure, whereby said garment can be donned in a first pressurized environment and then used in a second pressurized environment having a pressure lower than said first pressurized environment such that said bladder expands in size in said second pressurized environment, the expansion in size resulting in a continuous counter pressure by said bladder against said tissue.

2. The garment of claim 1, wherein said supportive material is configured to conform to a contour of said tissue.

3. The garment of claim 1, wherein said bladder is configured to conform to a contour of said tissue.

4. The garment of claim 1 further comprising a plurality of said bladders respectively disposed against a plurality of regions comprising blood supplied tissue.

5. A mechanical counter pressure glove, comprising:

an elastic supportive material; and a plurality of pre-pressurized bladders permanently sealed at a pre-determined pressure, said bladders disposed against blood supplied tissue of a wearer of said glove, said supportive material exerting a continuous force against said bladders, said bladders thereby exerting a continuous counter pressure against said blood supplied tissue, whereby said glove can be donned in a first pressurized environment and then used in a second pressurized environment having a pressure lower than said first pressurized environment such that said bladders expand in size in said second pressurized environment, the expansion in size resulting in a continuous counter pressure by said bladders against said tissue.

6. The glove of claim 5, wherein at least one of said bladders is configured to match a contour of a palm of a hand.

7. The glove of claim 5, wherein at least another one of said bladders is configured to match a contour of a dorsum of said hand.

8. The glove of claim 5, wherein said bladders are pre-pressurized at a pre-selected pressure to match a breathing pressure of said user.

9. A partial pressure space suit glove, comprising:

an elastic supportive material; and a plurality of pre-pressurized and permanently sealed bladders disposed between said supportive material and blood supplied tissue of a wearer of said glove, said bladders being positioned adjacent a palm of a hand such that when the glove is donned the supportive material exerts a continuous force against said bladders and said bladders thereby exert a continuous, first counter pressure against said blood supplied tissue, said first counter pressure being at a first selected pressure, whereby said glove can be donned in a first pressurized environment and then used in a second pressurized environment having a pressure lower than said first pressurized environment such that said bladders expand in size in said second pressurized environment, the expansion in size resulting in a continuous, second counter pressure by said bladders against said tissue, said second counter pressure in said second pressurized environment being at a second selected pressure that is greater than said first selected pressure.

10. The glove of claim 9, wherein at least one bladder is configured to conform to a contour of said palm.

11. The glove of claim 9, wherein at least one bladder is configured to conform to a contour of a dorsum of said hand.

12. The glove of claim 9, wherein said bladders are made of rubber.

13. The glove of claim 9, wherein said bladders are made of a closed cell foam.

14. The glove of claim 9, wherein said bladders are capable of applying a counter pressure of about 4.3 psi on said hand.

\* \* \* \* \*